United States Patent [19]
Goebels

[11] 4,230,377
[45] Oct. 28, 1980

[54] PRESSURE CONTROL VALVE UNIT

[75] Inventor: Hermann J. Goebels, Schwieberdingen, Fed. Rep. of Germany

[73] Assignee: Robert Bosch GmbH, Stuttgart, Fed. Rep. of Germany

[21] Appl. No.: 12,186

[22] Filed: Feb. 14, 1979

[30] Foreign Application Priority Data

Mar. 9, 1978 [DE] Fed. Rep. of Germany ....... 2810151

[51] Int. Cl.³ .............................................. B60T 8/06
[52] U.S. Cl. ..................................... 303/118; 303/40; 303/119
[58] Field of Search ................. 303/119, 118, 117, 69, 303/40; 188/181 A

[56] References Cited

U.S. PATENT DOCUMENTS 3,743,362  7/1973  Neisch ................................. 303/118

FOREIGN PATENT DOCUMENTS 1630544  5/1971  Fed. Rep. of Germany .
2625502  12/1977  Fed. Rep. of Germany .......... 303/118

*Primary Examiner*—Douglas C. Butler
*Attorney, Agent, or Firm*—Edwin E. Greigg

[57] ABSTRACT

A pressure control valve unit for an anti-locking apparatus in motor vehicle wheel brakes which is actuatable by a control pressure which controls the brake pressure in at least one wheel brake cylinder, the pressure control valve unit having a pressure exchange chamber, which alternatively has brake cylinder pressure and atmospheric pressure, defined by a switching diaphragm and the switching diaphragm comprising the switching member of a relay valve on one side and on the side—like the closing body of a rapid-release valve—is provided the monitor member of a brake cylinder line leading to the outside air so that the pressure control valve unit combines the advantages of relay and switching valves without their disadvantages and the valve unit can be utilized in other fields, which can be accomplished by simple additional switching arrangements and which extend beyond the normal anti-locking protection function.

11 Claims, 5 Drawing Figures

PRESSURE CONTROL VALVE UNIT

CROSS-REFERENCE TO RELATED DISCLOSURES

Applicant's copending U.S. Pat. No. 4,153,307 is incorporated herein by reference as to the method of operation of the 2/2-way valves described therein.

BACKGROUND OF THE INVENTION

The invention relates to a pressure control valve unit of the type such as is shown in the German Offenlegungsschrift No. 2,625,502. In this known construction, the relay valve monitors only an outside-air connection. It is also known to embody anti-locking protection pressure control valves as complete relay valves, as is shown in the German Auslegeschrift No. 1,630,544. The main advantages in doing so, besides being able to omit the special relay valves or rapid-release valves as well which are often required are as follows:

During normal braking (without anti-locking protection control):
rapid aeration and ventilation in long brake lines;
rapid-release effect when releasing the brake;
movement of the switching elements during each braking occurence; and
load-dependent control devices with small flow-through cross sections when attached to the control circuit.

During regulated braking (when there is anti-locking protection control):
a pressure gradient substantially independent of brake cylinder volume, because of the unitary effect; brake cylinders of different size as well as cylinder volumes which become larger with surface wear have no effect on the regulatory effectiveness;
the inclusion and regulation of several brake cylinders is possible simultaneously, such as in the case of axle regulation.

However, the relatively large structural volume of these valves has a disadvantageous effect on the regulatory function. The long switching times caused thereby result in insufficient pressure modulation values, which do not permit sufficient regulator performance for individual wheel regulation.

Also with respect to cost, relay pressure control valves for individual wheel regulation are too expensive, since, of course, for this type of regulation, a relay pressure control valve is required for each wheel.

Relay pressure control valves therefore are most often utilized as axle regulation valves, that is, for a type of regulation in which several brake cylinders are simultaneously regulated so that they have a common brake pressure level.

In contrast, rapid-switching valves of simple design (without a relay function and without a proportional characteristic), of small structural volume, are inserted for individual wheel regulation; however, because of their functional characteristic, they do not have the advantages, which are in themselves desirable for individual wheel regulation as well, of the relay pressure control valves.

OBJECT AND SUMMARY OF THE INVENTION

The pressure control valve unit of the invention has the advantage over the prior art in that by combining individual switching elements of relay and switching valves, the advantages of these two valve groups are united, without, however, the imposition of their inherent disadvantages.

It is of further advantage that new areas of utilization can be entered with the pressure control valve unit according to the invention, these areas extending beyond the normal anti-locking protection function and being attainable by means of relatively simple additional switching arrangements.

The invention will be better understood as well as further objects and advantages thereof become more apparent from the ensuing detailed description of preferred embodiments taken in conjunction with the drawings.

DESCRIPTION OF THE PREFERRED EMBODIMENTS

Figure 1:
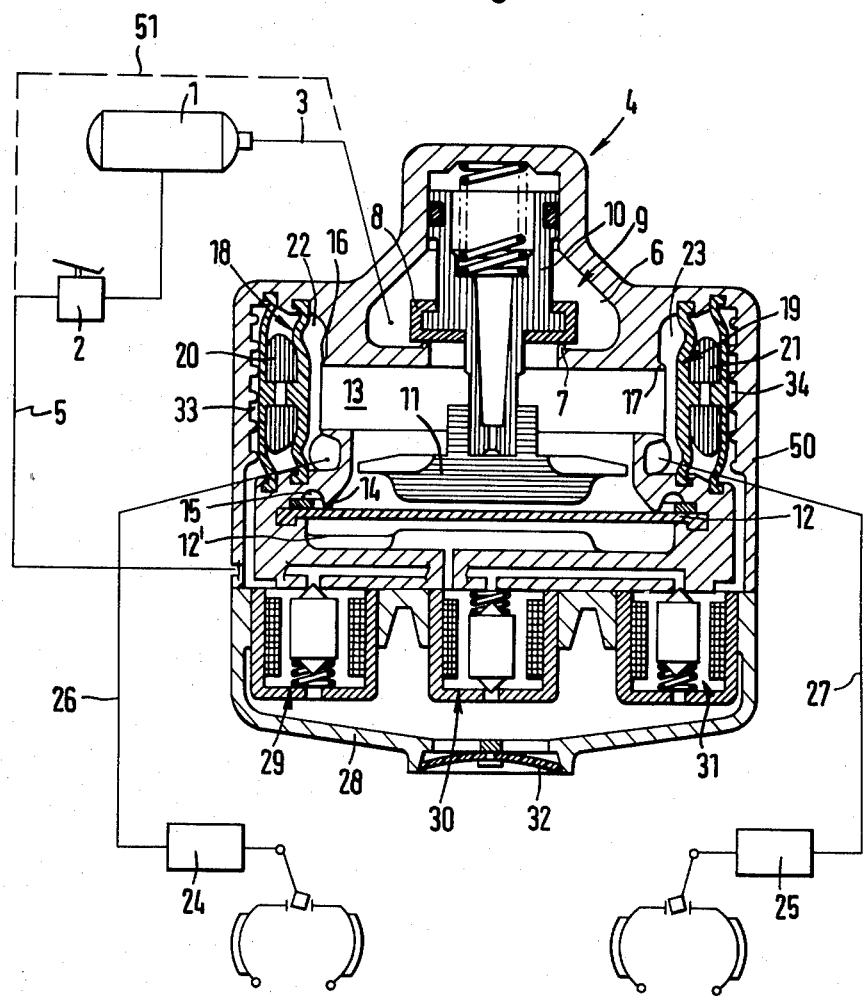
FIG. 1 is a sectional view of a pressure control valve unit constructed in accordance with the invention.

Referring now to FIG. 1, a reserve supply container 1 is connected at one side to a pedal brake valve 2 and on the other side to a pressure control valve unit 4 through a reserve supply line 3. A control line 5 proceeds from the brake valve 2 which also leads to the pressure control valve unit 4.

The reserve supply line 3 is attached within the pressure control valve unit 4 to a reserve pressure chamber 6, which has a valve seat 7 for a closing body 8 of a relay valve 9. A pressure-relieving rod 10 of the closing body 8 penetrates the valve seat 7 and supports a diaphragm plate 11 at its other end which is intended for cooperation with a switching diaphragm 12.

Figure 5:
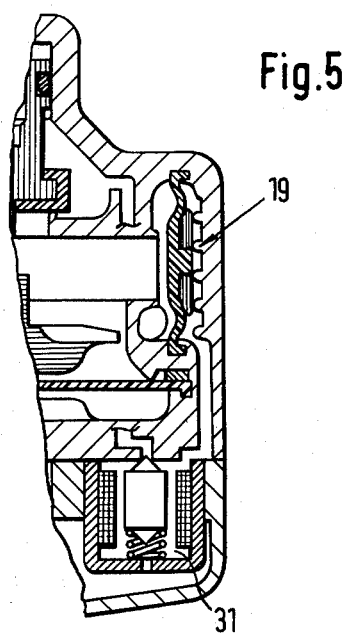
FIG. 5 is a sectional view of a portion of another embodiment of the pressure control unit of the invention.

The rod 10 and the diaphragm plate 11 are located within a pressure exchange chamber 13, which is defined by a valve seat 14 and communicates, when the diaphragm 12 rests on the valve seat 14, with reserve pressure and, when the diaphragm 12 is lifted from the valve seat 14, communicates with outside air through an annular channel 15 as shown also in FIG. 5. The seat 14 and the diaphragm 12 thus form an outlet valve 12/14. A control chamber 12' is disposed beneath the diaphragm 12.

The pressure exchanger chamber 13, in the two-channel embodiment shown in FIG. 1, has further lateral valve seats 16 and 17 for 2/2-way valves 18 and 19, which have diaphragm-closing members 20 and 21 disposed within a chamber 22 and 23 with which the brake cylinder lines 26 and 27 leading to the brake cylinders 24 and 25 respectively, communicate. On the other side of the diaphragm-closing members 20 and 21, there are control chambers 33 and 34, respectively.

Three magnetic valves 29, 30 and 31 in the form of 3/2-way valves are disposed within a lower housing portion 28. These magnetic valves 29, 30, 31 are pre-control valves for the control chambers 12', 33 and 34. The lower housing portion 28 has an outside-air attachment 32 at the bottom which is monitored by a check valve and is covered at the top by an upper housing portion 50, which includes the relay valve 9 and the valve 12/14.

Mode of Operation

The control chamber 12' is subjected to pressure through the control line 5 when the magnetic valve 30 is open, i.e., when there is no current. The switching diaphragm 12 moves upward, contacts the valve seat 14, and thereby blocks the connection between the pressure exchanger chamber 13 and the ventilation as shown best in FIG. 3.

Subsequently the pressure-relieving valve rod 10 is lifted by the diaphragm plate 11 and the closing body 8 is lifted from its seat 7. Reserve air flows from the chamber 6 through the opened 2/2-way valves 18 and 19 to the brake cylinders 24 and 25 and braking occurs.

In the pressure exchange chamber 13, a pressure builds up which rises, as reactive pressure, until the pressure level of the control pressure in the control chamber 12' is reached. By means of the balance of forces thus obtained at the switching diaphragm 12, the spring-loaded valve rod 10 can move toward the valve seat 7 and reach it. In this position, the switching diaphragm 12 rests on the valve seat 14. By this means, reserve pressure, brake cylinder pressure and ventilation are mutually blocked.

If the control pressure below the switching diaphragm 12 is dropped, for example, through the brake valve 2 or through the magnetic valve 30 as well, then the reactive pressure in the chamber 13 immediately predominates and lifts the switching diaphragm 12 from the valve seat 14, so that the reactive pressure and thus, when the 2-way valves 18, 19 are not blocked, the brake pressure in the brake cylinders 24 and 25 as well are decreased until such time as the balance of forces has been reinstated.

In addition to the means of regulating brake cylinder pressure by the control pressure, the brake cylinder pressure in the attached brake cylinders 24 and 25 can also be influenced by the 2-way valves 18 and 19, which can be actuated through the pre-control magnetic valves 29 and 21, in such a manner that the brake pressures in the brake cylinders 24 and 25 can be blocked by the pressure exchange chamber 13. Since this blocking function can occur by way of the 2-way valves 18 and 19 independently of the particular position at that time (pressure decrease or pressure buildup) of the relay valves, the following pressure functions are attainable simultaneously:

pressure decrease in both brake cylinders 24 and 25;
pressure decrease in one brake cylinder and pressure maintenance in the other brake cylinder;
pressure maintenance in one brake cylinder and pressure buildup in the other brake cylinder;
pressure buildup in both brake cylinders 24 and 25, to the same or to different pressure levels.

Thus, either a common or an individual wheel regulation can be performed with only one pressure control valve unit 4, with additional functional advantages, beyond those found in the switching valves conventionally employed in individual wheel regulation, which are derived from the relay function.

As is indicated by broken lines in FIG. 1, the reserve pressure chamber 6 can also be supplied with control line pressure via a control line 51, instead of with reserve pressure.

Figure 2:
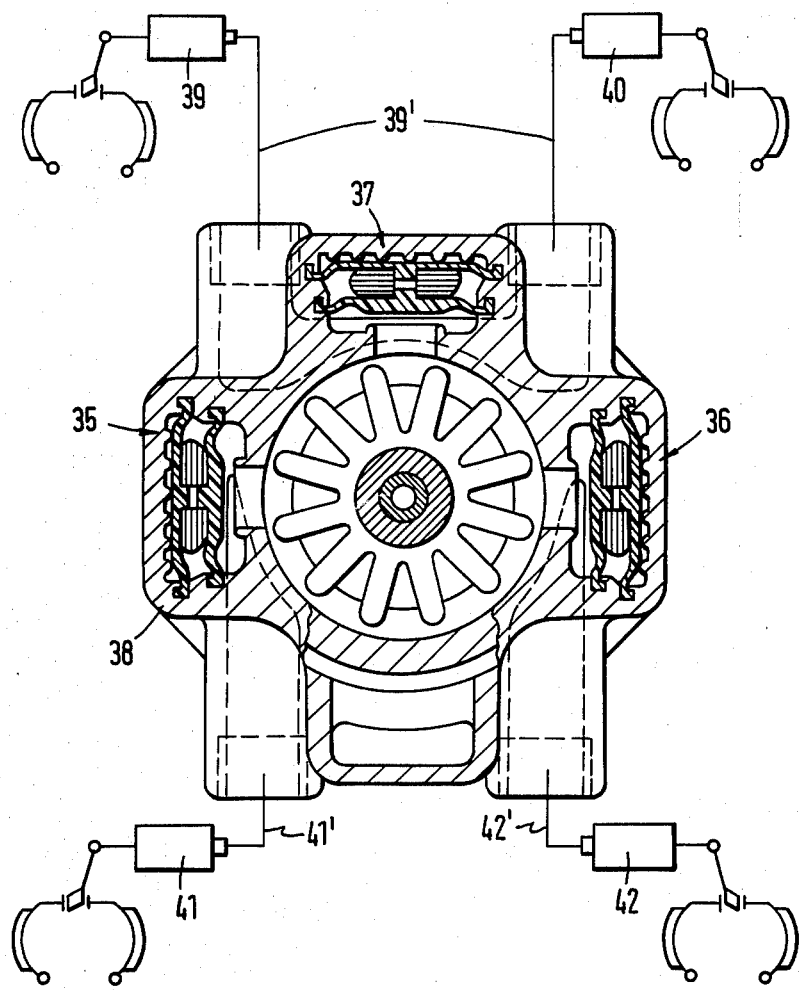
FIG. 2 is a plan view, partially in section, of a three-channel embodiment of the invention.

In the embodiment of FIG. 2, an arrangement for a three-channel brake pressure control means is shown. In FIG. 2, there is shown a T-shaped arrangement of three 2-way valves 35, 36 and 37, which make possible three-channel brake pressure control having only one pressure control valve unit. Four brake cylinders 39, 40, 41 and 42 are attached to the pressure control valve unit 38 through brake cylinder lines 39', 41' and 42'. The 2-way valve 37 has two brake cylinder line attachments, so that all four brake cylinders can be attached, each to its own brake cylinder line attachment.

Regulating a double-axle unit with individual wheel regulation on one vehicle axle and a common brake pressure control on the other axle is also conceivable. Although, in this event, there are widely varying brake cylinder volumes to be aerated and ventilated, since, depending on the requirements of the type of regulation, either individual brake cylinders or all at once must be aerated and ventilated, so that constant pressure gradients are produced by the unitary function.

This unitary function is accomplished in that the given control circuit having a constant control chamber volume is aerated and ventilated through the magnetic valve 30 (FIG. 1) having flow-through cross sections which are likewise constant, yielding a pressure gradient which is shaped accordingly. As a result of the necessary balance between control circuit and reactive circuit, the pressure gradient of the reactive circuit as well is predetermined and is automatically regulated, by means of a corresponding stroke setting at both the relay valve 9 and the outlet valve 12/14, to correspond with the particular brake cylinder volume to be aerated and ventilated.

Since, however, because of the valve hysteresis there is a certain inertia between control pressure and reactive pressure, it would be relatively difficult to control exact brake pressure values in the brake cylinders without the rapid 2-way valves 18, 19 or 35, 36, 37; in particular, insufficient pressure modulations, some of them substantial in extent, would be unavoidable.

Thus, it is advantageous that the rapid-switching, differential-piston-type 2-way valves embodied in a double-diaphragm arrangement are disposed directly in the connection between the reactive circuit and the brake cylinders. In this way, the regulatory effectiveness, which is absolutely necessary for individual wheel regulation, is attainable with assurance even with a multiple-channel relay pressure control valve, such as is shown in FIGS. 1 and 2.

Figure 3:
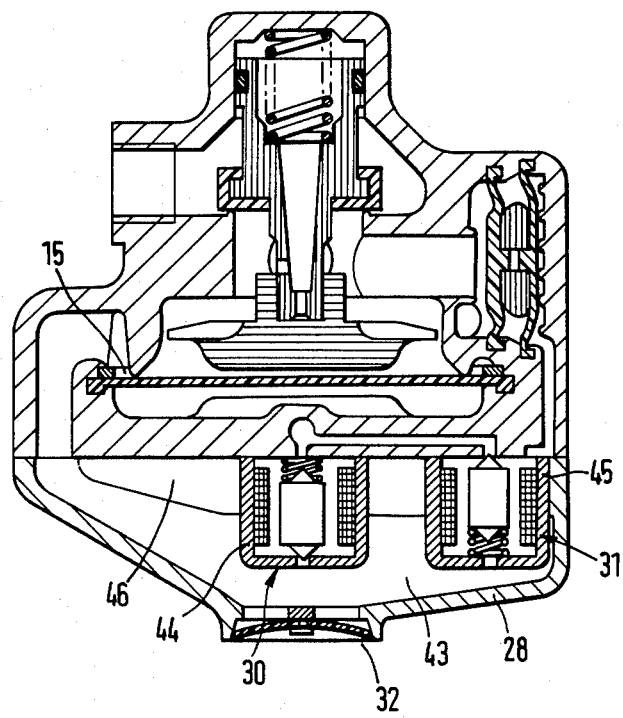
FIG. 3 is a sectional view of the embodiment of FIG. 2 rotated by 90°.

Furthermore, as with the novel arrangement of component parts, functional dependability for the construction of the pressure control valve unit of the invention has been obtained. For example, the disposition of the valves is selected so that water condensation which might appear in air brakes can automatically flow down by force of gravity to the central outside-air connection which is located at the bottom, or can also easily be carried to the outside during ventilation as shown in FIGS. 1 and 3.

In order that the control chambers of the 2-way valves 18, 19 and 35, 36, 37 operate with similar advantages, their diaphragm-closing members were disposed as double diaphragms in a standing position and the magnetic valves 29, 30 and 31 were located at the lowest point of the pressure control valve unit. The connection bores to the brake cylinders 24 and 25, or 39, 40, 41, 42, were also located at the lowest point of the 2-way valve. For reasons of the same considerations, the magnetic valves 29, 30 and 31 were disposed in a suspended position beneath the control chambers 12', 33 and 34.

The disposition of the central outside-air attachment 32, which represents a common outside-air connection for the relay valve and the magnetic valves produces distinct advantages and furthermore protects against the intrusion of water spray from outside.

Measures were also taken to damp the noise generated by the ventilation operations, which take place in sudden bursts. It can be seen by reference to FIG. 1 and FIG. 3, which illustrates the outside-air connection more clearly, that the lower housing portion 28, which has the central outside-air connection 32 at its lowest point and into which an outside-air channel attached to the annular channel 15 discharges, has a relatively large cavity 43. In this cavity 43, the magnetic valves 29, 30, and 31 are held only by strips 44. In this manner, the cavity 43 is effective as a damping chamber, which produces a significant noise damping of the ventilation operations.

Furthermore, the lower housing portion 28 provided with strips 44 permits a simple and cost-effective mounting of the magnetic valves 29, 30 and 31, which are simply pressed into position and are then immovably seated.

Figure 4:
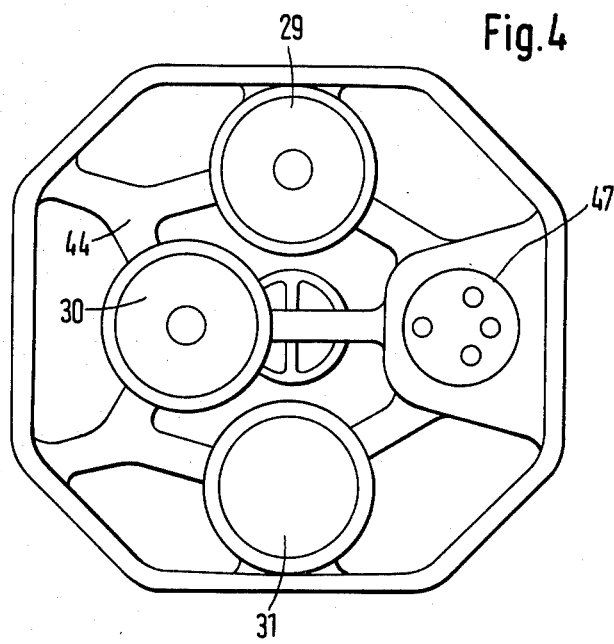
FIG. 4 is a plan view of the arrangement of magnetic valves for the embodiment of FIG. 1.

FIG. 4 shows in plan view a central magnetic valve plug 47, by means of which all the magnetic valves 29, 30 and 31 are controllable.

The pressure control valve unit 4 according to the invention also permits utilization in other areas with particularly advantageous results. Thus, when building in or attaching a magnetic valve through an internal connecting line, reserve pressure can be directed into the control chamber 12' directly by the magnetic valve 30. As a result, brake pressure can be directed into the attached brake cylinders through the additional magnetic valve as well as through the brake valve 2. Although the pressure control by the brake valve is effective at all axles, the control can intentionally be accomplished at individual brake cylinders through the additional magnetic valve.

With the aid of this one additional magnetic valve and a relatively simple expansion of the anti-locking protection logic circuit, a regulation of drive slippage, for example, can be performed at the driving axle of a railway car. The slipping wheel (rotating without traction), which can be recognized by the anti-locking protection logic circuit through the wheel sensors, is then braked through the additional magnetic valve and simultaneously the buildup of brake pressure for the nonslipping wheel is prevented by blocking the associated 2-way valve. By means of regulating both wheels to the same slippage, that is, to the same rpm, the effect of a mechanical blockage differential can be precisely attained, but with very much less expense.

As has been conventional so far, the state of readiness for slippage regulation can be initiated by the driver, for example, through a switch, or automatically as well by means of the expanded anti-locking protection logic circuit, which recognizes the slipping wheel through a positive slippage shaft and initiates the automatic slippage regulation. Of course, the additional magnetic valve can also be disposed anywhere in the vehicle.

In place of a magnetic valve, the pressure control of individual brake cylinders can also be accomplished with a conventional, mechanically actuated 3/2-way valve, which can, for example, be engaged by a toggle for the duration of the drive slippage regulation at the driver's direction.

If, instead of the toggle, a lockable control with a separate key is provided, then theft protection can also be obtained, which in the simplest manner prevents the unauthorized appropriation of the vehicle by braking the attached brake cylinders.

Beyond the advantages already described, the structure having the additional magnetic valve also has the advantage that all the valve elements, including the magnetic valves, can be tested under pressure. By simultaneously setting all the magnetic valves, pressure is directed into the relay valve, but the further brake pressure buildup in the brake cylinders is prevented by blocking the 2-way valves, so that even during driving, a test cycle can be run.

It is also advantageous that when braking with the brake valve, the control chambers are charged with brake valve pressure. In this manner, it is always possible for the driver to release the brakes, at any time and independently of the valve position or of the magnetic valve position as well—an advantage which in known constructions must be provided by supplementary check valves.

In any event, it is also conceivable that the 2-way valves be actuated by reserve pressure through the magnetic valves 29, 31. Then the advantage is that the 2-way valve can be provided with only one diaphragm. This embodiment is shown in FIG. 5.

It is also advantageous that only small control chambers are aerated or ventilated at a particular time by the magnetic valves or by the mechanically actuatable 3/2-way valve as well. As a result, these valves can be formed with small flow-through cross sections, which is favorable in terms of both effort and cost. This advantage also pertains when there is an automatically load-dependent brake pressure control device attached during initiation of control in the control circuit. Thus, and also as a result of the elimination of the relay valve often required, the utilization of the pressure control valve unit according to the invention offers significant cost advantages.

For example, as compared with conventionally employed anti-locking protection pressure control valves, the following devices can be eliminated, or smaller devices can be used, for the rear axle of a railway car:

1 relay valve;
1 anti-locking protection pressure control valve; and
1 rapid-release valve.

When employing a supplementary 3/2-way valve, a mechanical differential block and an expensive theft protection apparatus may be eliminated. Finally, a load-dependent brake pressure control device can have a small structural volume.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A pressure control valve unit for an anti-locking protection apparatus in motor vehicle wheel brakes control pressure means which is actuable in direct proportion to a reactive pressure in a pressure exchange chamber attachable on one side to a reserve supply line and on the other side to a relief point and which control pressure controls the brake pressure in at least one wheel brake cylinder, a valve unit housing, said pressure exchange chamber positioned in said valve unit housing, a switching diaphragm in said pressure exchange chamber, relay valve means having a switching member under control pressure on one side of said switching diaphragm and a monitor member for a brake cylinder line communicating with the outside air on the other side of said switching diaphragm.

2. A pressure control valve unit in accordance with claim 1, wherein said relay valve means includes a valve shaft on a plurality of 2-way valves having shafts which are inserted in the inlet side of the brake cylinder lines, said valve shaft of said relay valve means disposed in perpendicular relationship with said shafts of said 2-way valves.

3. A pressure control valve unit in accordance with claim 2, wherein said 2-way valves are disposed about the relay valve means in oppositely disposed relationship.

4. A pressure control valve unit in accordance with claim 2, including a plurality of magnetic valves for actuation of the 2-way valves, said magnetic valves being disposed beneath said relay valve means and said 2-way valves.

5. A pressure control valve unit in accordance with claim 4, including a brake valve control line and wherein said magnetic valves are attached to said brake valve control line.

6. A pressure control valve unit in accordance with claim 4, wherein said magnetic valves are adapted to supply said 2-way valves with reserve pressure.

7. A pressure control valve unit in accordance with claim 1, wherein valves are provided within said pressure control valve unit housing and including a single common outside-air connection, an outlet valve for monitoring said single common outside-air connection on the lower side of said housing.

8. A pressure control valve unit in accordance with claim 7, wherein said housing includes an upper portion and a lower portion, magnetic valves being disposed in said lower portion and including a plurality of ribs forming a cavity in said housing created by means of strips which is effective as a damping chamber for the purpose of noise damping.

9. A pressure control valve unit in accordance with claim 8, including a plurality of ventilation channels, said ventilation channels having a constant slope to the common outside-air connection monitored by said check valve at the lowest point of said lower housing portion.

10. A pressure control valve unit in accordance with claim 9, wherein said magnetic valves within said lower housing portion are electrically drivable through a central plug.

11. A pressure control valve unit in accordance with claim 10, including a separate brake cylinder line attachment for each brake cylinder.

* * * * *